Patented Aug. 27, 1940

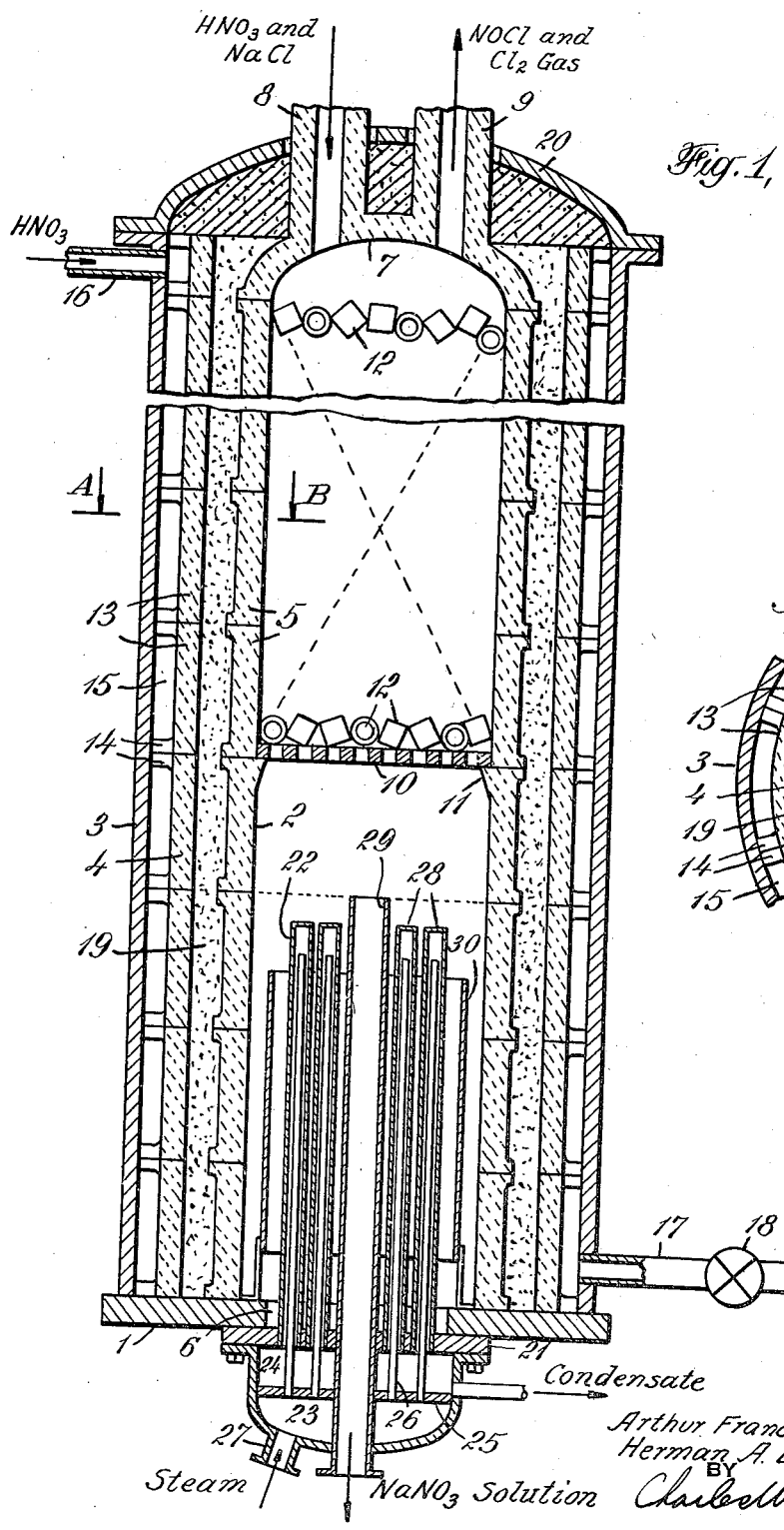

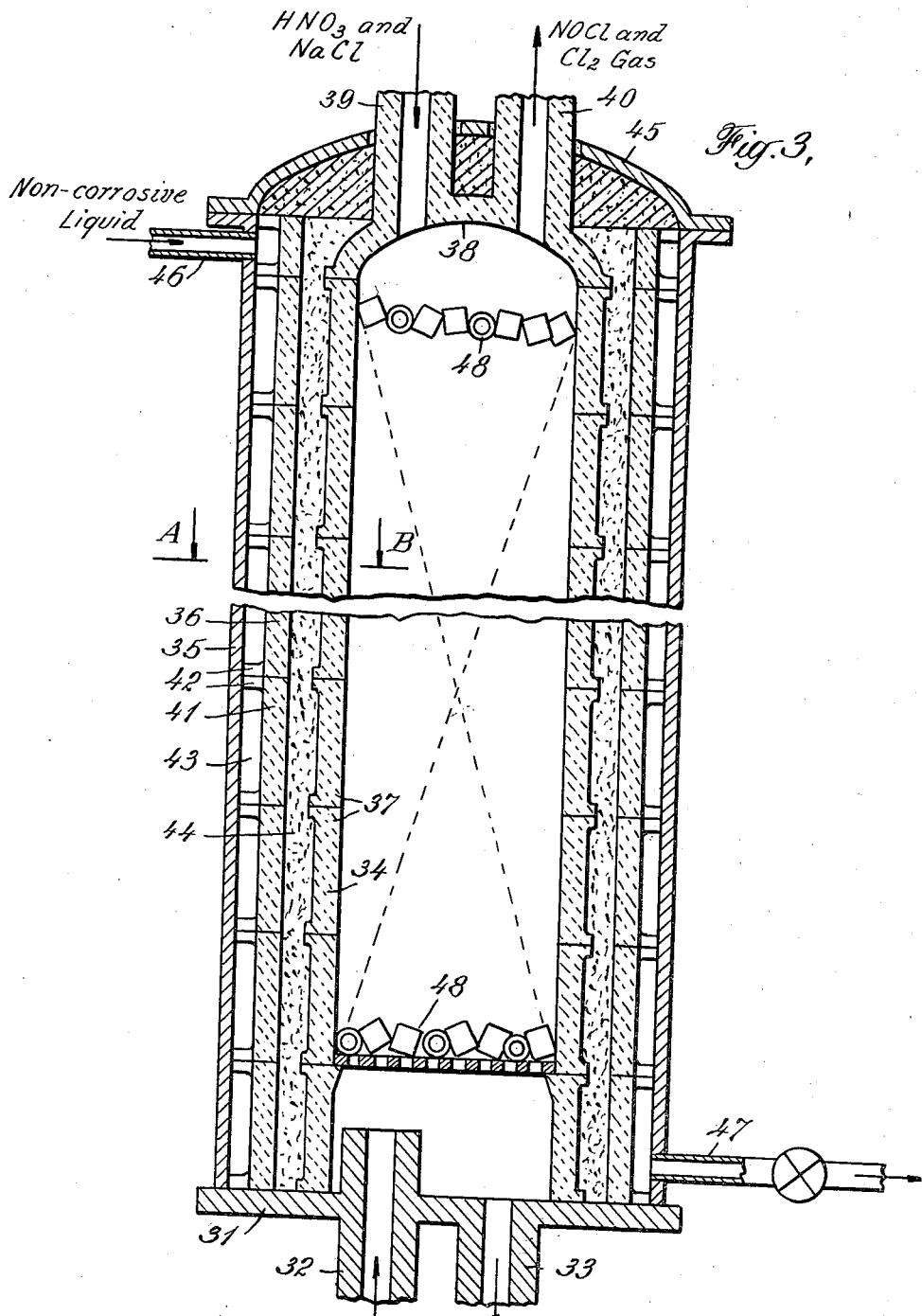

2,212,835

UNITED STATES PATENT OFFICE 2,212,835

APPARATUS FOR REACTING NITRIC ACID AND A METAL CHLORIDE

Arthur Francis Keane, Prince George County, and Herman A. Beekhuis, Jr., Petersburg, Va., assignors to The Solvay Process Company, New York, N. Y., a corporation of New York Application June 10, 1938, Serial No. 212,878

16 Claims. (Cl. 23—283)

This invention relates to an apparatus for carrying out the reaction of nitric acid and a metal chloride such as sodium, potassium or calcium chloride, to form the corresponding metal nitrate and evolve either nitrosyl chloride and chlorine or hydrogen chloride as gaseous products of the reaction.

A reaction mixture containing nitric acid and a chloride and the gaseous products of reaction of the acid and chloride are highly corrosive. It is of great importance, therefore, to provide an apparatus for the treatment of such a reaction mixture which will be fluid-tight and at the same time not be rapidly corroded and destroyed by the corrosive material. It is also of importance to provide an apparatus which is sufficiently rugged mechanically to withstand the stresses to which it is subjected in operation. These mechanical stresses may arise from changing temperature conditions in the apparatus or from mechanical blows or forces applied to the apparatus.

Many materials of construction, which are suitably resistant to corrosion by the fluids present in reacting nitric acid and a metal chloride, do not lend themselves to the construction of a single piece of apparatus of sufficient size for commercial operation but, instead, it is necessary to build up the apparatus from numerous sections or parts joined together. The joints between these sections, even though closed by a corrosion-resistant cement, represent points at which fluid may escape from the interior of the apparatus. Furthermore, materials suitably resistant to corrosion may have low mechanical strength. They may be especially subject to breakage by shock, as in the case of glass or ceramic materials.

It is an object of this invention to provide an apparatus for carrying out the reaction of nitric acid and a metal chloride in which a reaction vessel constructed of a material which is suitably resistant to corrosion by the fluids contained therein is surrounded by an outer shell of material suitably resistant to mechanical stresses and attack of the outer shell by leakage of fluid from the inner reaction vessel is prevented. It is further an objective of this invention to provide a composite apparatus resistant to corrosion by the fluids contained therein which is readily constructed and at the same time is mechanically rugged and tight against escape of fluid from the interior of the apparatus and will give long service under highly corrosive conditions. Further, it is an object of this invention to provide an apparatus in which a vessel or chamber within which a reaction mixture of nitric acid and metal chloride is processed is constructed of a plurality of joined sections of a material resistant to corrosion by the fluid and leakage of fluid from the vessel is prevented.

The apparatus of this invention comprises a reaction vessel or tower open at the bottom and provided with a closure for the top of the vessel. This vessel and closure are constructed of a material suitably resistant to corrosion by a reaction mixture of nitric acid and metal chloride and the hydrogen chloride or mixture of nitrosyl chloride and chlorine produced by the reaction of the acid and metal chloride. Means are provided for introducing the nitric acid and metal chloride into and for withdrawing the gaseous products from the top of the vessel and for withdrawing from the bottom of the vessel nitrate solution produced therein. A shell, also open at the bottom, surrounds the vessel leaving a space between the inner wall of the shell and the outer wall of the vessel. A plate abuts both the bottom of the reaction vessel and the bottom of the shell. This plate is constructed of a material resistant to corrosion by the metal nitrate solution resulting from reaction of the nitric acid and metal chloride or by the reaction mixture itself.

In the space between the reaction vessel and the surrounding shell there is maintained a mantle of liquid which is noncorrosive towards the material of which the shell is constructed. This liquid mantle preferably fills the space between vessel and shell and is preferably maintained under a pressure exceeding that within the vessel so that any flow of fluid through the wall of the vessel is inwardly rather than permitting fluid to escape from the inside of the vessel. With this arrangement the liquid forming the mantle is preferably water, nitric acid, aqueous nitrate solution or the acidic nitrate solution which is the product of the reaction which takes place within the vessel.

On the other hand, it is not necessary that the mantling liquid fill the space between the reaction vessel and shell or that it be one of the above mentioned liquids. One or both walls bounding the space between the vessel and shell may be washed with a liquid which will absorb and dilute fluids escaping into this space from the vessel and the liquid may be flowed through and withdrawn from the space, thereby preventing corrosive fluid reaching the material of which the shell is constructed in sufficient amounts to corrode it. Instead of merely washing the wall or walls of this space with the mantling liquid, the space, of course, may be filled with liquid which is continuously flowed through the space to absorb and carry away fluid leaking from the inner vessel. When the mantling liquid is thus continuously flowed through the space between the vessel and shell under a pressure lower than that within the vessel so any leakage is from the inside of the vessel into the space between it and the shell, the mantling liquid is preferably water or a dilute solution of an alkaline material such as sodium carbonate which will neutralize acidic fluids escaping from the inner vessel.

In the preferred form of apparatus of this invention the plate abutting the bottom of the reaction vessel and of the shell is preferably constructed of a metal which is resistant to corrosion by nitric acid solutions containing no more than a small proportion of chloride such as the acid-nitrate solution produced by the reaction of the nitric acid and metal chloride. The reaction vessel is a vertical tower containing a packing material, mounted on a metal plate resistant to corrosion by the acid nitrate solution produced by the reaction taking place within the tower. The reaction mixture introduced at the top of the tower flows downwardly therethrough under the influence of gravity and the acid nitrate solution is withdrawn from the bottom. The gaseous products of the reaction pass upwardly in the tower away from the metal plate, to escape from the top of the tower. Other types of reaction vessel may, however, be employed in the apparatus of this invention so long as they provide for the flow of liquid substantially uniformly towards the end from which the metal nitrate solution is withdrawn and the flow of gaseous products away from this end of the vessel.

The attached drawings illustrate two examples of apparatus embodying this invention, although the invention is not limited to the specific forms of the apparatus of these examples. Figs. 1 and 3 of the drawings are cross-sections of the two apparatus in elevation and Fig. 2 is a cross-section of a part of each apparatus taken along the lines A—B of Figs. 1 and 3.

The apparatus shown in Fig. 1 comprises an annular base plate 1 on which is mounted both a tower or inner reaction vessel 2 and an outer shell 3, between which there is a partition 4, spaced both from the wall of vessel 2 and the wall of shell 3. Vessel 2 is constructed of a plurality of joined, superimposed sections 5 each of which is in the form of a short cylinder. The bottom section rests directly on plate 1 and surrounds the opening 6 through this plate. The top of vessel 2 is closed by a cover 7, which carries an inlet 8 for nitric acid and metal chloride, such as sodium chloride, and an outlet 9 for the gaseous products of the reaction of the acid and chloride, which are nitrosyl chloride and chlorine.

In the lower portion of the vessel there is a perforated plate 10 supported on an annular ledge 11 formed at the top of one of the cylindrical sections 5. Plate 10 supports a packing material 12 which occupies the greater portion of the interior of vessel 2 and serves to intimately contact the reaction mixture flowing downwardly through the vessel with gases and vapors passing upwardly therethrough. This packing material may consist of packing rings, as shown in the drawings, or any other of the well known means for insuring intimate contact between a gas and a liquid passing countercurrent through a tower or chamber may be employed in place of the packing illustrated.

Cylindrical sections 5, partition 4, cover 7, plate 10 and packing 12 are of a material resistant to corrosion by the reaction mixture of nitric acid and sodium chloride. For example, they may be constructed of glass or of a ceramic material. Base plate 1 is preferably constructed of a chrome-iron alloy containing about 28% chromium, less than 2% nickel, and the remainder principally iron. Shell 3 is preferably constructed of a chrome-iron alloy containing about 18% chromium, about 8% nickel, and the remainder principally iron.

Partition 4 is formed of a plurality of tiles 13 curved, as shown in Fig. 2, to conform to the curvature of the walls of vessel 2 and shell 3. While tiles 13 are preferably of the same materials resistant to corrosion by the nitric acid-sodium chloride reaction mixture as sections 5 of the reaction vessel, they may be of a material somewhat less resistant to corrosion. Each of tiles 13 carries at its four corners projections 14 which serve to space the body of the tile from the wall of shell 3 leaving a space or chamber 15 between partition 4 and shell 3. An inlet pipe 16 for liquid at the upper portion of shell 3, communicates with chamber 15 and a liquid outlet pipe 17 from the bottom of the shell serves for withdrawal of liquid from the chamber whenever this is desirable. Inlet pipe 16 is connected with a source of, for example, 60% to 65% nitric acid. Outlet pipe 17 is provided with a valve 18 and may lead to a vessel from which nitric acid may be recirculated back to inlet pipe 16 or, if desired, the acid may be employed for making up the reaction mixture introduced into the top of the reaction vessel through inlet 8. By adjusting valve 18 or the rate of introducing nitric acid through pipe 16, chamber 15 may be kept filled with the nitric acid up to the level of inlet pipe 16. Under these conditions the pressure of the nitric acid in chamber 15 will be greater than the pressure of the fluids within vessel 2.

The space 19 between partition 4 and the wall of vessel 2 is filled with a cement resistant to corrosion by the acidic fluids in vessel 2. This cement is preferably a sodium silico-fluoride cement which is mixed with sodium silicate solution and filled into space 19 where the mixture hardens. Other cements may be employed, for example, one prepared by mixing sodium silicate solution with ground silicates such as ceramic ware, glass, etc. Such materials may be filled into space 19 and form a semi-fluid mass filling this space. This mass, however, will harden into a solid cement at any points where acid may come into contact with it, as for example by escaping from within vessel 2. These cements may also be used between the joined surfaces of sections 5 of vessel 2 or these sections may merely be superimposed upon one another with the cement covering the outside of the joints between the sections.

Shell 3 is constructed of a material which is not attacked by the fluid in chamber 15. For example, employing nitric acid in this chamber, shell 3 may be of a chrome-iron alloy containing about 18% or more chromium. This shell is in the form of a cylinder the bottom of which rests upon abutting base plate 1. The top of the shell is closed by a cover 20 having in its apertures through which inlet 8 and outlet 9 of vessel 2 project. The space at the top of the apparatus between cover 20 and vessel 2 may be filled with cement. This may be done before cover 20 is put in place by filling the cover with the cement, with forms inserted to provide passageways for inlet 8 and outlet 9, and hardening the cement before withdrawing these forms and putting the cover in place on the apparatus.

Base plate 1 is preferably of a chrome-iron alloy containing about 28% chromium, less than 2% nickel, and the remainder principally iron. A heater comprising a plate or tube sheet carrying heating tubes is attached to the base plate, the plate or tube sheet closing the opening in the base plate and the heating tubes projecting therethrough into the bottom of the reaction vessel. The preferred form of heater is, as shown in Fig. 1, of the bayonet type, having a tube sheet 21 bolted to plate 1 with the bundle of tubes 22 of the heater projecting through the opening in annular plate 1 into the bottom of vessel 2. This heater assembly comprises a steam chamber 23 separated from a condensate chamber 24 by a tube sheet 25 carrying tubes 26. Steam introduced through an inlet 27 passes through tubes 26 to the upper end of tubes 28 and thence downwardly in the latter tubes towards chamber 24. An overflow pipe 29 traverses chambers 23 and 24 and extends into the bottom of vessel 2 to a point above the top of the bundle of tubes 22. This overflow pipe 29 serves as an outlet for the sodium nitrate solution produced by reaction of the nitric acid and sodium chloride in vessel 2 while maintaining in the bottom of the vessel a body of this solution which submerges the bundle of tubes 22. A cylindrical baffle 30 is supported on plate 1 with its bottom a short distance above this plate and its top somewhat below the top of the bundle of tubes 22. Like base plate 1 the heater assembly with its cylindrical baffle 30 and overflow tube 29 are preferably constructed of a chrome-iron alloy containing about 28% chromeiron, less than 2% nickel and the remainder principally iron.

In operating the apparatus illustrated in Figs. 1 and 2, a reaction mixture of sodium chloride and an excess of nitric acid, prepared by mixing 40% or stronger nitric acid, preferably an acid containing 60% to 65% HNO3, with solid, substantially dry sodium chloride, is introduced through inlet 8 into the top of vessel 2 and flows downwardly over the packing in this vessel. The acidic solution of sodium nitrate resulting from the reaction of the nitric acid and sodium chloride is boiled in the bottom of vessel 2 and the stream evolved passes upwardly in the vessel heating the descending reaction mixture and stripping from it the gaseous products of the reaction, nitrosyl chloride and chlorine, which pass upwardly in countercurrent flow with the incoming reaction mixture and escape from the top of the vessel through outlet 9. The reaction mixture entering vessel 2 flows progressively downwardly through the vessel and by the time the resulting nitrate solution reaches the bottom portion of the vessel the reaction is substantially complete and the solution which is boiled in the bottom of the vessel contains but a low concentration of chloride. This acidic nitrate solution of low chloride content is much less corrosive towards chrome-iron alloys than is the entering reaction mixture high in chloride content. Accordingly, such alloys are suitable materials of construction for the base plate and heater assembly at the bottom of vessel 2.

We have discovered, however, that in order to prevent severe corrosion of the metallic parts of the apparatus exposed to attack with the acid nitrate solution resulting from this reaction the metal surfaces must be maintained completely wetted with the solution. Accordingly, although considerations of efficient heat transfer would lead to overflow 29 being so positioned as to maintain the liquid level in the bottom of vessel 2 below the tops of the nest of tubes 22, we have found that this level should be maintained as described above, above the tops of these tubes, in order that they may be submerged in and thus completely wetted by the nitrate solution in order to prevent serious corrosion of the metal.

Furthermore, it is important that the reaction mixture flow progressively through the reaction vessel towards the outlet end of the vessel and the gaseous products of the reaction flow away from this end of the vessel in order that the chloride content of the liquid which contacts with the metal of which base plate 1 and the heater assembly are constructed may be kept low and these metals not be corroded. Were the incoming reaction mixture permitted to immediately mix with the solution in the outlet end of the vessel with which these metal surfaces were in contact or were the gaseous products of the reaction permitted to flow towards this end of the vessel, the resulting relatively high chloride content introduced into the nitrate solution in contact with the chrome-iron surfaces at the bottom of the reaction vessel would cause corrosion of these surfaces.

It will be apparent that an apparatus constructed in accordance with this invention is peculiarly suitable for carrying out the reaction of nitric acid and a metal chloride without being rapidly corroded and destroyed by the extreme corrosive conditions presented by this process. The surfaces in this apparatus exposed to contact with reaction mixture containing high concentrations of chloride, and thus extremely corrosive, are constructed of materials such as a ceramic or glass which are resistant to the corrosive conditions presented by the process. The apparatus of the invention provides a metallic heater for efficiently supplying heat to the reaction mixture and provides protection for the metal surfaces of this heater and the connection between it and the reaction vessel against contact with solutions high in chloride. Furthermore, the shell which surrounds and supports the reaction vessel is protected against leakage of corrosive fluid from within the vessel. The construction of this vessel is such that minimum strains are imposed upon the reaction vessel. By having the outside diameter of the open bottom of the vessel which abuts the base plate as large as that of any other portion of the vessel, the vessel is subjected to a minimum upward pressure by the mantle of liquid in chamber 15. When the apparatus is heated the metallic outer shell is free to expand independently of the inner reaction vessel.

The apparatus described is thus particularly suitable for large scale commercial operations. It embodies a rugged construction, in that a reaction vessel made of materials of high resistance to corrosion but of low mechanical strength is supported and protected by an outside shell of metal of high mechanical strength. The particular construction of the apparatus shown in Fig. 1 is advantageous with respect to the ease of assembly of its component parts. Thus, shell 3 may be mounted on base plate 1 and then vessel 2 and partition 4 may be built up within the shell by successively placing on base plate 1 the several sections of which these elements are constructed. As these sections are put in position the space 19 may be filled with the cement to hold each section in place until the entire assembly is completed and the cover 20 put into position.

Any cracks which may develop in the reaction vessel, cement or partition will not permit the escape of reaction mixture because of the liquid filling chamber 15 being under a higher pressure than that of the fluids within the reaction vessel. While the liquid thus used to prevent escape of fluid from the vessel may be continuously flowed through chamber 15 as mentioned above, it is not necessary to maintain a flow of acid through this chamber. Thus, valve 18 may be kept closed and acid introduced through inlet pipe 16 to compensate for seepage into vessel 2 and maintain the proper level of liquid in chamber 15. On the other hand, it is not necessary that the mantling liquid completely fill chamber 15; for example, inlet pipe 16 may lead to a spray pipe which leads around the top of chamber 15 and is provided with perforations or nozzles arranged to project the acid against the inside wall of shell 3 down which the acid will flow as a continuous sheet of liquid which will absorb, dilute and carry away through outlet pipe 17 any fluids escaping from vessel 2 into chamber 15. When this mode of maintaining a mantle of protective liquid between vessel 2 and shell 3 is adopted, the liquid may be one which will neutralize acidic fluids, thus providing an added protection for shell 3.

With reference to the apparatus shown in Fig. 3, it comprises a base plate 31 having an inlet for steam 32 and a liquid outlet 33. This base plate carries an inner reaction vessel 34 and an outer shell 35 between which there is a partition 36 spaced from the wall of vessel 34 and the wall of shell 35. Base plate 31 may be constructed of the same material as the sections of which vessel 34 are constructed, e. g. of a ceramic material or of glass suitably supported by means not shown in the drawing to carry the weight of the structure resting upon the base plate.

The construction of vessel 34, partition 36 and shell 35 is the same as the corresponding portions of the apparatus of Fig. 1 which have been described above. Thus vessel 34 is constructed of a plurality of joined superimposed sections 37 supported by plate 31 and the top of this vessel is closed by cover 38 carrying an inlet 39 for the nitric acid-sodium chloride reaction mixture and an outlet 40 for the gaseous products of the reaction. Partition 36 is formed of tiles 41 like tiles 13 of the apparatus of Fig. 1, having projections 42 which serve to space the body of the tile from the wall of shell 35 to leave a chamber 43 between partition 36 and shell 35. The space 44 between partition 36 and the wall of vessel 34 is filled with cement which is resistant to corrosion by the nitric acid-sodium chloride reaction mixture which also fills the space below cover 45 of shell 35. Shell 35 is also provided with an inlet pipe 46 to chamber 43 for a liquid which forms a mantle in this chamber between the shell and vessel 34. An outlet pipe 47 from the bottom of chamber 43 is also provided so that, if desired, a continuous flow of liquid through the chamber may be maintained. The interior of vessel 34 is provided with a packing material 48 to insure intimate contact between the descending flow of reaction mixture and the steam introduced through inlet 32 ascending in vessel 34.

In employing this apparatus for carrying out the reaction of nitric acid and metal chloride, reaction mixture introduced to the top of vessel 34 flows downwardly through the vessel and the resulting acidic nitrate solution is withdrawn through outlet 33. Steam from an outside source is introduced through inlet 32 and serves to heat the reaction mixture and strip from it the gaseous products of the reaction which may be nitrosyl chloride and chlorine or hydrogen chloride, depending upon the concentration of nitric acid used in making up the reaction mixture, the amount of steam introduced into the reaction vessel and the temperature to which the reaction mixture is heated.

Numerous changes and modifications may be made in the specific examples of the apparatus of this invention illustrated in the accompanying drawings and described above. For example, the reaction vessel instead of being constructed of numerous superimposed sections may be monolithic. Such a monolithic reaction vessel may be constructed by placing upon the base plate forms into which an acid-resistant cement is poured which, when hardened and the forms are removed, will constitute a tower similar to that formed by the sections of which the vessels described above are constructed.

While it is preferred to provide mechanical support for the reaction vessel by the outer shell through the medium of a partition supported by the shell and a filling of cement between the partition and vessel as shown in the two examples described above, this invention is not limited to such a construction of the apparatus. For example, the partition and cement between it and the reaction vessel shown in these examples may be omitted and the entire space between the reaction vessel and outer shell may be filled with the mantling liquid to prevent attack of the shell by fluid escaping from the vessel. Instead of keeping this space filled with the liquid, the liquid may be continuously flowed downwardly over the inside wall of the shell or the outside wall of the vessel or both, to dilute and carry away corrosive fluid escaping from the vessel. Added protection for the shell may be obtained, if desired, by lining the shell with a protective coating or lining of tile or cement leaving a space between this lining and the vessel to form the chamber for the mantling liquid.

In an apparatus constructed as described in the preceding paragraph, when the reaction vessel is built up of a plurality of joined sections, these sections are preferably cemented together or the joints between the sections are constructed in any one of numerous methods known to the art to increase the fluid tightness of the joints as compared with the construction, illustrated in the drawings, in which the sections merely rest one upon the other.

We claim:

1. In combination in an apparatus for carrying out the reaction of nitric acid and a metal chloride, a reaction tower closed at the top and open at the bottom, the outside diameter of the bottom of the tower being at least substantially as large as that of any other portion of the tower, means for introducing nitric acid and metal chloride into and for withdrawing from said tower the gaseous reaction products and the metal nitrate solution formed therein, a shell surrounding said tower and having its inner wall spaced from the outer wall of the tower, a base plate abutting and serving as the closure for both the open bottom of said tower and the bottom of said shell, said base plate carrying the weight of said tower and shell, and a mantle of liquid non-corrosive towards the material of which said shell is constructed between the shell and reaction tower, said mantle of liquid completely enveloping the reaction tower from its closed top to the base plate abutting its bottom, thereby preventing access to said shell of fluid which escapes from within the reaction tower.

2. In combination in an apparatus for carrying out the reaction of nitric acid and a metal chloride, a reaction tower and closure for the top thereof, the outside diameter of the bottom of the tower being at least substantially as large as that of any other portion of the tower, said tower and closure being constructed of material resistant to corrosion by a reaction mixture of nitric acid and metal chloride and the gaseous products of the reaction thereof, means for introducing nitric acid and metal chloride into and for withdrawing gaseous reaction products from the top of said tower, a shell surrounding said tower and having its inner wall spaced from the outer wall of the tower, a base plate abutting and serving as a closure for both the bottom of said tower and the bottom of said shell and supporting the tower and shell, said plate being constructed of a material resistant to corrosion by the metal nitrate solution resulting from reaction of the nitric acid and metal chloride, means for withdrawing said metal nitrate solution from the bottom of said tower, and a mantle of liquid non-corrosive towards the material of which said shell is constructed between the shell and reaction tower, said mantle of liquid completely enveloping the tower from the closure for its top to the base plate which abuts the bottom of the tower, thereby preventing access to said shell of fluid which escapes from within the reaction tower.

3. In combination in an apparatus for carrying out the reaction of nitric acid and a metal chloride, a base plate of a material resistant to corrosion by the metal nitrate solution resulting from reaction of the nitric acid and metal chloride, a reaction tower having an open bottom mounted on said base plate, the outside diameter of the bottom of the tower being at least substantially as large as that of any other portion of the tower said tower being constructed of material resistant to corrosion by a reaction mixture of nitric acid and metal chloride and the gaseous products of the reaction thereof, a closure on the top of said tower having an inlet, for introducing nitric acid and metal chloride into and an outlet for withdrawing gaseous reaction products from the interior of said tower, a shell having an open bottom mounted on said base plate, said shell surrounding said tower and having its inner wall spaced from the outer wall of the tower, a chamber surrounding said tower and within said shell, a mantle of liquid non-corrosive towards the material of which said shell is constructed in said chamber between the shell and tower, said mantle of liquid being under a higher pressure than the pressure within said tower and completely enveloping the tower from the closure for its top to the base plate which abuts the bottom of the tower, thereby preventing access to said shell of fluid which escapes from within the tower, means for withdrawing the resulting metal nitrate solution from the bottom of said tower and means for introducing steam into contact with reaction mixture in the lower portion of the tower.

4. In combination in an apparatus for carrying out the reaction of nitric acid and a metal chloride, an annular base plate of a material resistant to corrosion by the metal nitrate solution resulting from reaction of the nitric acid and metal chloride, a reaction tower closed at its top and having an open bottom mounted on said base plate with the bottom of the tower surrounding the opening in said annular plate, the outside diameter of the bottom of the tower being at least substantially as large as that of any other portion of the tower said tower being constructed of material resistant to corrosion by a reaction mixture of nitric acid and metal chloride and the gaseous products of the reaction thereof, a closure on the top of said tower having an inlet for introducing nitric acid and metal chloride into and an outlet for withdrawing gaseous reaction products from the interior of said tower, a shell having an open bottom mounted on said base plate, said shell surrounding said tower and having its inner wall spaced from the outer wall of the tower, a chamber surrounding said tower and within said shell and closed at the bottom by the aforesaid annular plate, a mantle of liquid non-corrosive towards the material of which said shell is constructed in said chamber between the shell and tower and completely enveloping the tower from the closure for its top to the base plate which abuts the bottom of the tower, thereby prevening access to said shell of fluid which escapes from within the tower, means for withdrawing the resulting metal nitrate solution from the bottom of said tower and a heater comprising a plate carrying heating tubes of a material resistant to corrosion by said metal nitrate solution, said plate being fixed to said annular plate and closing the opening therein with the heating tubes projecting into the bottom of said tower through said opening.

5. In combination in an apparatus for carrying out the reaction of nitric acid and a metal chloride, a base plate of a material resistant to corrosion by the metal nitrate solution resulting from reaction of the nitric acid and metal chloride, a shell mounted on said base plate, a plurality of superimposed cylindrical sections mounted upon said base plate within said shell and spaced from the inner wall of said shell, forming a cylindrical tower, a closure for the top of said tower, said sections and closure being constructed of material resistant to corrosion by a reaction mixture of nitric acid and metal chloride and the gaseous products of the reaction thereof, means for introducing nitric acid and metal chloride into and for withdrawing gaseous reaction products from the top of said tower, a partition constructed of joined sections of a material resistant to corrosion by said reaction mixture and gaseous products supported by said base plate and positioned between and spaced from the outer wall of said tower and the inner wall of said shell, a cement resistant to corrosion by said reaction mixture and gaseous products filling the space between the joined sections of said tower and said partition, an inlet for liquid to the space between the outer wall of said partition and the inner wall of said shell, and means for withdrawing said metal nitrate solution from the bottom of said tower.

6. In combination in an apparatus for carrying out the reaction of nitric acid and a metal chloride, an annular base plate of a material resistant to corrosion by the metal nitrate solution resulting from reaction of the nitric acid and metal chloride, a shell mounted on said base plate, a plurality of superimposed cylindrical sections mounted upon said base plate within said shell and spaced from the inner wall of said shell, forming a cylindrical tower the bottom of which surrounds the opening in said annular plate, a closure for the top of said tower, said sections and closure being constructed of material resistant to corrosion by a reaction mixture of nitric acid and metal chloride and the gaseous products of the reaction thereof, means for introducing nitric acid and metal chloride into and for withdrawing gaseous reaction products from the top of said tower, a partition constructed of joined sections of a material resistant to corrosion by said reaction mixture and gaseous products supported by said base plate and positioned between and spaced from the outer wall of said tower and the inner wall of said shell, a cement resistant to corrosion by said reaction mixture and gaseous products filling the space between the joined sections of said tower and said partition, an inlet for liquid to the space between the outer wall of said partition and the inner wall of said shell, a bayonet type heater comprising a bundle of heating tubes and a tube sheet, said tube sheet being fixed to and closing the opening in said annular plate with the bundle of heating tubes projecting into the bottom of said tower through said opening, and an overflow pipe for withdrawal of liquid from the bottom of said tower which projects through the tube sheet of said heater into the tower and terminates therein at a point above the uppermost end of said bundle of heating tubes.

7. In combination in an apparatus for carrying out the reaction of nitric acid and a metal chloride, a reaction vessel constructed of material resistant to corrosion by a reaction mixture of nitric acid and metal chloride and the gaseous products of the reaction thereof, means for continuously introducing nitric acid and metal chloride into one end of said reaction vessel and for maintaining a flow of the nitric acid and chloride and their liquid reaction product substantially uniformly away from said end of the reaction vessel, a heater projecting into the other end of said reaction vessel, said heater having heat transfer surfaces composed of a metal resistant to corrosion by said metal nitrate solution, means for withdrawing from this end of said reaction vessel metal nitrate solution resulting from reaction of the nitric acid and metal chloride, while maintaining said heat transfer surfaces within said vessel completely submerged in said metal nitrate solution, and means for causing the gaseous products of the reaction to flow substantially uniformly away from the last mentioned end of the vessel and for withdrawing the gaseous products of the reaction from the first mentioned end of the vessel.

8. In combination in an apparatus for carrying out the reaction of nitric acid and a metal chloride, a base plate of a material resistant to corrosion by the metal nitrate solution resulting from reaction of the nitric acid and metal chloride, a shell mounted on said base plate, a tower having an open bottom mounted upon said base plate within said shell and spaced from the inner wall of the shell, a closure for the top of said tower, said tower and closure being constructed of material resistant to corrosion by a reaction mixture of nitric acid and metal chloride and the gaseous products of the reaction thereof, means for introducing nitric acid and metal chloride into and for withdrawing gaseous reaction products from the top of said tower, a partition constructed of a material resistant to corrosion by said reaction mixture and gaseous products supported by said base plate and positioned between and spaced from the outer wall of said tower and the inner wall of said shell, a cement filling the space between said tower and said partition, said cement being resistant to corrosion by said reaction mixture and gaseous products, an inlet for liquid to the space between the outer wall of said partition and the inner wall of said shell, and means for withdrawing said metal nitrate solution from the bottom of said tower.

9. In combination in an apparatus for carrying out the reaction of nitric acid and a metal chloride, a base plate of a chrome-iron alloy resistant to corrosion by the metal nitrate solution resulting from reaction of the nitric acid and metal chloride, a reaction tower having an open bottom mounted on said base plate, said tower being constructed of a material resistant to corrosion by a reaction mixture of nitric acid and metal chloride and the gaseous products of the reaction thereof from the group consisting of glass, the acid-resistant ceramic materials and acid-resistant cements, means for introducing nitric acid and metal chloride into and for withdrawing gaseous reaction products from the top of said tower, a metallic shell having an open bottom mounted on said base plate, said shell surrounding said tower and having its inner wall spaced from the outer wall of the tower, a chamber surrounding said tower and within said shell, said chamber being closed at the bottom by said base plate, a mantle of liquid non-corrosive towards the material of which said shell is constructed in said chamber between the shell and tower and under a higher pressure than the pressure within said tower, means for withdrawing metal nitrate solution from the bottom of said tower and means passing through said base plate into the interior of the tower for introducing steam into contact with reaction mixture in the lower portion of the tower.

10. In combination in an apparatus for carrying out the reaction of nitric acid and a metal chloride, an annular base plate of a metal resistant to corrosion by the metal nitrate solution resulting from reaction of the nitric acid and metal chloride, a reaction tower arranged for flow of liquid downwardly towards the bottom of the tower and of gaseous reaction product upwardly away from the bottom of the tower, said tower having an open bottom mounted on said base plate with the bottom of the tower surrounding the opening in said annular plate and being constructed of material resistant to corrosion by a reaction mixture of nitric acid and metal chloride and the gaseous products of the reaction thereof from the group consisting of glass, the acid-resistant ceramic materials and acid-resistant cements, means for introducing nitric acid and metal chloride into and for withdrawing gaseous reaction products from the top of said tower, a metallic shell having an open bottom mounted on said base plate, said shell surrounding said tower and having its inner wall spaced from the outer wall of the tower, a chamber surrounding said tower and within said shell and closed at the bottom by the aforesaid annular plate, a mantle of liquid non-corrosive towards the material of which said shell is constructed in said chamber between the shell and tower, means for withdrawing metal nitrate solution from the bottom of said tower and a heater comprising a metallic plate carrying metallic heating tubes, both said plate and heating tubes being constructed of a metal resistant to corrosion by said metal nitrate solution, said plate being fixed to said annular plate and closing the opening therein with the heating tubes projecting into the bottom of said tower through said opening.

11. In combination in an apparatus for carrying out the reaction of nitric acid and a metal chloride, a reaction vessel constructed of material resistant to corrosion by a reaction mixture of nitric acid and metal chloride and the gaseous products of the reaction thereof, means for continuously introducing nitric acid and metal chloride into one end of said reaction vessel and for maintaining a flow of the nitric acid and chloride and their liquid reaction product substantially uniformly away from said end of the reaction vessel, a heater projecting into the other end of said reaction vessel, said heater having heat transfer surfaces composed of a chrome-iron alloy containing about 28% chromium, less than 2% nickel and the remainder principally iron, means for withdrawing from this end of said reaction vessel metal nitrate solution resulting from reaction of the nitric acid and metal chloride while maintaining said heat transfer surfaces within said vessel completely submerged in said metal nitrate solution, and means for causing the gaseous products of the reaction to flow substantially uniformly away from the last mentioned end of the vessel and for withdrawing the gaseous products of the reaction from the first mentioned end of the vessel.

12. In combination in an apparatus for carrying out the reaction of nitric acid and a metal chloride, a base plate of a material resistant to corrosion by the metal nitrate solution resulting from reaction of the nitric acid and metal chloride, a reaction tower having an open bottom mounted on said base plate, said tower being constructed of a non-metallic material resistant to corrosion by a reaction mixture of nitric acid and metal chloride and the gaseous products of the reaction thereof, a closure on the top of said tower having an inlet for introducing nitric acid and metal chloride into and an outlet for withdrawing gaseous reaction products from the interior of said tower, a metallic shell having an open bottom mounted on said base plate, said shell surrounding said tower and having its inner wall spaced from the outer wall of the tower, a chamber surrounding said tower and within said shell, said chamber being closed at the bottom by said base plate, a mantle of liquid non-corrosive towards the metal of which said shell is constructed in said chamber between the shell and tower, said mantle of liquid completely enveloping the tower from the closure at its top to the base plate abutting its bottom, thereby preventing access to said shell of fluid which escapes from within the reaction tower, and means for withdrawing metal nitrate solution from the bottom of said tower.

13. In combination in an apparatus for carrying out the reaction of nitric acid and a metal chloride, a base plate of a material resistant to corrosion by the metal nitrate solution resulting from reaction of the nitric acid and metal chloride, a reaction tower having an open bottom mounted on said base plate, said tower being constructed of a material resistant to corrosion by a reaction mixture of nitric acid and metal chloride and the gaseous products of the reaction thereof from the group consisting of glass, the acid-resistant ceramic materials and acid-resistant cements, a closure on the top of said tower, an inlet for introducing nitric acid and metal chloride into and an outlet for withdrawing gaseous reaction products from the top of said tower, a metallic shell having an open bottom mounted on said base plate, said shell surrounding said tower and having its inner wall spaced from the outer wall of the tower, a chamber surrounding said tower and within said shell, said chamber being closed at the bottom by said base plate, a mantle of liquid non-corrosive towards the material of which said shell is constructed in said chamber between the shell and tower, said mantle of liquid completely enveloping the tower from the closure at its top to the base plate abutting its bottom, thereby preventing access to said shell of fluid which escapes from within the reaction tower, means for withdrawing metal nitrate solution from the bottom of said tower and means passing through said base plate into the interior of the tower for heating the reaction mixture in the lower portion of the tower.

14. In combination in an apparatus for carrying out the reaction of nitric acid and a metal chloride, a reaction tower having a closure for its top and constructed of a non-metallic material resistant to corrosion by an aqueous reaction mixture of nitric acid and metal chloride, means for introducing nitric acid and metal chloride into and for withdrawing gaseous reaction products from the upper part of said tower and for withdrawing metal nitrate solution from the lower part of said tower, a sheath of cement on the outside of the wall of and surrounding said tower, said cement being resistant to corrosion by the reaction mixture of nitric acid and metal chloride and gaseous products evolved therefrom, a metallic shell surrounding said tower and sheath and spaced therefrom, and a mantle of liquid non-corrosive towards the material of which said shell is constructed between the shell and the sheath which surrounds the reaction tower.

15. In combination in an apparatus for carrying out the reaction of nitric acid and a metal chloride, a reaction tower closed at the top and open at the bottom and constructed of a non-metallic material resistant to corrosion by an aqueous reaction mixture of nitric acid and metal chloride, means for introducing nitric acid and metal chloride into and for withdrawing gaseous reaction products from the upper part of said tower, a sheath of cement on the outside of the wall of and surrounding said tower, said cement being resistant to corrosion by the reaction mixture of nitric acid and metal chloride and gaseous products evolved therefrom, a metallic shell surrounding said tower and sheath and spaced therefrom, a metal base plate supporting said tower and its sheath of cement and said shell, said base plate abutting the bottom of said tower, sheath and shell and forming a closure for the bottom of the tower and sheath without being mechanically united thereto, a mantle of liquid non-corrosive towards the material of which said shell and base plate are constructed between the shell and the sheath which surrounds the reaction tower, and means for withdrawing through said base plate metal nitrate solution from within the tower.

16. In combination in an apparatus for carrying out the reaction of nitric acid and a metal chloride, a reaction tower having a closure for its top and constructed of joined sections of a non-metallic material resistant to corrosion by an aqueous reaction mixture of nitric acid and metal chloride, means for introducing nitric acid and metal chloride into and from withdrawing gaseous reaction products from the upper part of said tower and for withdrawing metal nitrate solution from the lower part of said tower, a sheath of cement on the outside of the wall of and surrounding said tower, said cement being resistant to corrosion by the reaction mixture of nitric acid and metal chloride and gaseous products evolved therefrom, a metallic shell surrounding said tower and sheath and spaced therefrom, and a mantle of liquid non-corrosive towards the material of which said shell is constructed between the shell and the sheath which surrounds the reaction tower.

ARTHUR FRANCIS KEANE.
HERMAN A. BEEKHUIS, Jr.